United States Patent [19]
Thomas

[11] Patent Number: 4,787,023
[45] Date of Patent: Nov. 22, 1988

[54] POWER SUPPLY APPARATUS

[75] Inventor: Friedrich-Werner Thomas, Gelnhausen, Fed. Rep. of Germany

[73] Assignee: Leybold-Heraeus GmbH, Cologne, Fed. Rep. of Germany

[21] Appl. No.: 59,589

[22] Filed: Jun. 8, 1987

[30] Foreign Application Priority Data

Jun. 12, 1986 [DE] Fed. Rep. of Germany ....... 3619801

[51] Int. Cl.$^4$ .......................................... H02H 7/125
[52] U.S. Cl. ...................................... 363/54; 363/86; 363/87; 363/129
[58] Field of Search ..................... 363/52–54, 363/84, 85, 86, 87, 88, 128, 129; 323/903

[56] References Cited

U.S. PATENT DOCUMENTS

| | | | |
|---|---|---|---|
| 3,470,444 | 9/1969 | Bixby | 363/87 |
| 4,320,305 | 3/1982 | Thomas | 363/87 |
| 4,329,595 | 5/1982 | Watson | 363/87 |
| 4,636,932 | 1/1987 | Kurosawa et al. | 363/129 X |

FOREIGN PATENT DOCUMENTS 1557010 3/1970 Fed. Rep. of Germany.
1303454 2/1972 Fed. Rep. of Germany.
3308411 9/1984 Fed. Rep. of Germany.

OTHER PUBLICATIONS

German Periodical, "etz-b" vol. 26, 1974, No. 17, pp. 429–433.
German Periodical, "Elektrizitatsverwertung", 1972, No. 6, pp. 205–208.

Primary Examiner—Peter S. Wong
Attorney, Agent, or Firm—Felfe & Lynch

[57] ABSTRACT

A power supply apparatus, in which the three phases of an alternating-current main are connected each through rectifier elements connected in antiparallel to the primary winding of a three-phase transformer. The secondary windings of this transformer are connected through rectifiers to a load device, such as an electron beam gun or other such device which produces short-circuits while in operation. Measuring sensors are provided on the primary AC side which, in the presence of an excess current on the primary AC side, block controlled rectifier elements. The blocking takes place very rapidly because GTO thyristors are used as rectifier elements. The decay of the magnetic energy in the transformer is achieved by the fact that the primary side of this transformer is connected in delta.

10 Claims, 3 Drawing Sheets

POWER SUPPLY APPARATUS

This invention relates to a power supply apparatus and, more particularly, to a power supply apparatus in which three phases of an alternating current main are connected through rectifier elements connected each in antiparallel, (opposed parallel relation) to the primary winding of a 3-phase alternating current transformer whose secondary windings feed a load through rectifiers, and in which sensors are provided on the primary alternating current side, which, in the presence of excessive current on the primary alternating current side, block controlled rectifier elements.

In electrical loads which are supplied with electrical power through power supplies, short-circuits sometimes occur which, if no special measures are taken, can lead to damage. Such damage is especially serious when it is done to expensive electron beam guns, sputtering cathodes, or high-voltage dust filter systems.

These short-circuits can be remedied by briefly shutting off the power supply, the interruption time being made just great enough to complete the de-ionization of the short-circuited section of the load. The duration of the interruption is established either on the basis of experience or it is determined by detecting the end of the flow of current to the load.

It is especially important that, upon the occurrence of short-circuits during operation, no damage is produced in the power supply, and that no safety means, such as fuses or circuit breakers, will respond which substantially lengthen the interruption or completely halt operation.

A 3-phase alternating current control is known, which can be used with the power supply of electron beam furnaces and consists of thyristors connected in antiparallel (periodical etz-b, vol. 26, 1974, No. 17, pp. 429–433). Here the control operates as a voltage regulator and switch which in the event of flashovers in a very high voltage test system will shut off this test system.

It is a disadvantage in this known 3-phase AC control that it operates with conventional thyristors which do not extinguish until the current passes through a null, so that, under certain circumstances, they remain conductive for as much as another half wave after detection of a short-circuit.

In another known high-voltage power supply for electron beam furnaces a thyristor bridge controller is used with a primary-side choke to smooth the current and to limit the short-circuit current (periodical "Elektrizitaetsverwertung", 1972, No. 6, pp. 205–208). Again it is disadvantageous in this case that conventional thyristors are used and a Y-Y transformer is connected to the output of the controller.

Furthermore, a power supply for an electrofilter is known in which a thyristor controller using gate-turn-off (GTO) thyristors is used (DE-OS No. 33 08 411). This known power supply also has a high-voltage transformer to whose primary winding a high-speed switch constructed of thyristors is connected in parallel. By the use of disconnectable GTO thyristors in conjunction with the high-speed switch which takes over the short-circuit current it is possible to reduce the energy fed to the filter after a short-circuit. It is disadvantageous in this case, however, that a three-phase arrangement of the high-speed switch is complicated.

Finally, another apparatus for the power supply of an electronic precipitator is known, in which the three phases of an AC power main are connected through rectifier elements connected in parallel to the primary winding of a 3-phase transformer whose secondary windings feed a load through rectifiers (DE-AS No. 13 03 454). Furthermore, in this apparatus sensors are provided on the primary AC side which in the event of a current excess on the primary AC side will block controlled rectifier elements. The disadvantage of this apparatus is that the rectifier elements connected in antiparallel are thyristors in only one direction of the current. Also, these thyristors are conventional thyristors, such as symmetrically blocking SCR thyristors, asymmetrically blocking ASCR thyristors, or reverse-conducting RIT thyristors, resulting in a very high short-circuit energy.

In a three-phase apparatus for power supply, the invention is addressed to the problem of substantially shortening the cut-off time on the one hand, and on the other hand of avoiding the use of high-speed switches parallel to transformer windings.

This problem is solved in a power supply as defined in that all rectifiers connected in antiparallel are GTO thyristors and the primary windings of the 3-phase AC transformer are connected in delta.

By the combination of these measures it is brought about that, in the event of very rapid shut-off by means of GTO thyristors, the energy content of the transformer is dissipated through its primary-side delta circuit. The advantage is thus obtained that no more large, heavy and expensive chokes are necessary on the load side. Furthermore, oversizing of the power electronic components is unnecessary. Furthermore, the current pulse to the main that occurs when the power supply is shut off is greatly reduced. Also, the danger of damage to the load is decidedly reduced.

In accordance with the invention, power supply apparatus comprises controlled rectifier elements connected in antiparallel relation and all being gate-turn-off thyristors. The apparatus includes a three-phase transformer having primary windings connected in delta and having secondary windings. The apparatus also includes means for connecting the three phases of a three-phase main each through the controlled rectifier elements connected in antiparallel relation to the primary windings of the three-phase transformer. The apparatus also includes rectifiers and load terminals fed by the secondary windings through the rectifiers on a direct current side. The apparatus also includes measuring sensors on the primary side alternating-current side of the transformer which, in the presence of an overload on the primary side alternating current side, block the controlled rectifier elements.

For a better understanding of the invention, together with other and further objects thereof, reference is made to the following description, taken in connection with the accompanying drawings, and its scope will be pointed out in the appended claims.

Referring now to the drawings.

Figure 1:
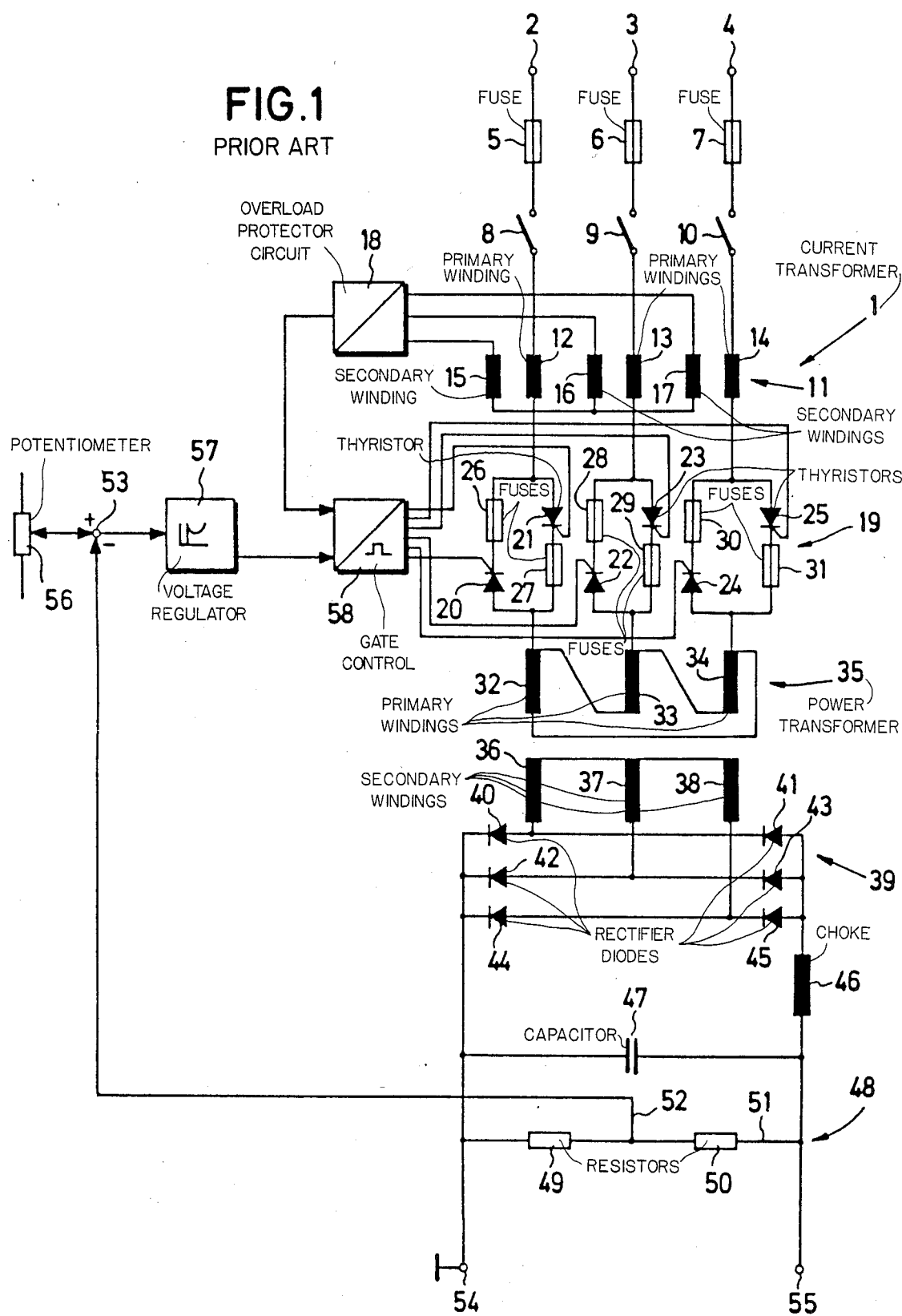
FIG. 1 is a schematic representation of a power supply for a power range from a few kilowatts to several hundred kilowatts.

FIG. 1 shows a three-phase power supply 1 which is connected at its input terminals 2, 3, 4, to a three-phase AC main which is not shown. The reference numbers 5, 6 and 7 relate to time-delay fuses which respond only exceptionally when an electronic overload protector, which will be described further below, does not respond. Connected to the fuses 5, 6, 7, are switches 8, 9, 10, for operational switching, which feed the three phases of the main to a current transformer which consists of three primary windings 12, 13, 14, and three secondary windings 15, 16, 17. The secondary windings 15, 16, 17, are to a certain extent current sensors which signal to an overload protective circuit 18 the currents which are flowing in the individual phases.

The primary windings 12, 13, 14, are connected to a current controller 19 which consists of three circuits each consisting of antiparallel thyristors 20-21, 22-23, 24-25. Ahead of the cathodes of these thyristors 20-25 are fast-acting semiconductor protectors 26-27, 28-29 and 30-31, respectively, which are also safety means which are to respond only upon the failure of the actual electronic overload or short-circuit protection means 18.

The current-control units 20/26/21/27, 22/28/23/29 and 24/30/25/31 are connected to a primary winding 32, 33 and 34, respectively, of a three-phase transformer 35 whose high-voltage secondary windings 36, 37 and 38 are connected to a three-phase rectifier 39. While the primary windings 32, 33, 34, of this transformer 35 are connected in delta, its secondary windings 36, 37, 38, are connected in Y. The delta circuit of the primary side of transformer 35 is especially important to the invention, because it permits the build-up of magnetic energy. The secondary winding 36 is connected to the junction between the anode of a diode 40 and the cathode of a diode 41, while the secondary winding 37 is connected to the junction between the anode of a diode 42 and the cathode of a diode 43. The secondary winding 38 is connected to the junction between the anode of a diode 44 and the cathode of a diode 45. Additional thyristors can be provided parallel to the windings 32-35 and can create short-circuits through which the magnetic energy of the transformer 35 can be dissipated still more rapidly. These additional thyristors, however, are not necessary in view of the delta circuit on the primary side.

A choke 46 is connected at its one terminal to the combined anodes of the diodes 41, 43, 45. The other terminal of this choke 46 leads to a condenser 47 which is connected to the cathodes of the diodes 40, 42, 44. Parallel to the condenser 47 there is provided a voltage divider 48 consisting of two resistors 49, 50, to whose common junction 51 a tap 52 is connected, which leads to a terminal point 53. The terminal of the choke 46, which is connected to the condenser 47 and the resistor 50, constitutes the one pole 54 of the DC supply voltage, while the interconnected cathodes of the diodes 40, 42, 44 constitute the other pole 55 of the DC supply voltage.

A preset voltage tapped at a potentiometer 56 is fed to the terminal point 53. From this preset voltage the voltage at tap 52 is subtracted and the difference is fed to a voltage regulator 57. This voltage regulator, which is preferably a PID regulator (a Proportional Integrating and Differentiating Controller), is connected to the grid control 58 of the thyristors 20-25 to which the electronic overload protector circuit 18 is connected. The electronic overload protector circuit 18 acts through the grid control 58 on the grids of the thyristors 20-25 which are connected to form a 3-phase AC controller.

By means of the transformer 35 the load voltage is adapted to the main voltage. This adapted voltage, amounting for example to several kilovolts, is rectified by the rectifier 39. The load voltage is detected through the voltage divider 48 and compared with the "required" voltage obtained from the potentiometer 56. The difference between the two voltages is fed to the voltage regulator 57 which operates the thyristors 20-25 accordingly through the grid control 58. The choke 46 together with the condenser 47 forms a smoothing circuit for the load circuit. When conventional thyristors are used, the main purpose of this choke 46, however, is to limit the rate of current rise in the case of short-circuit. If an over-current caused by the load is detected through the current transformer 11, this measurement is fed to the short-circuit protector 18.

Figure 2:
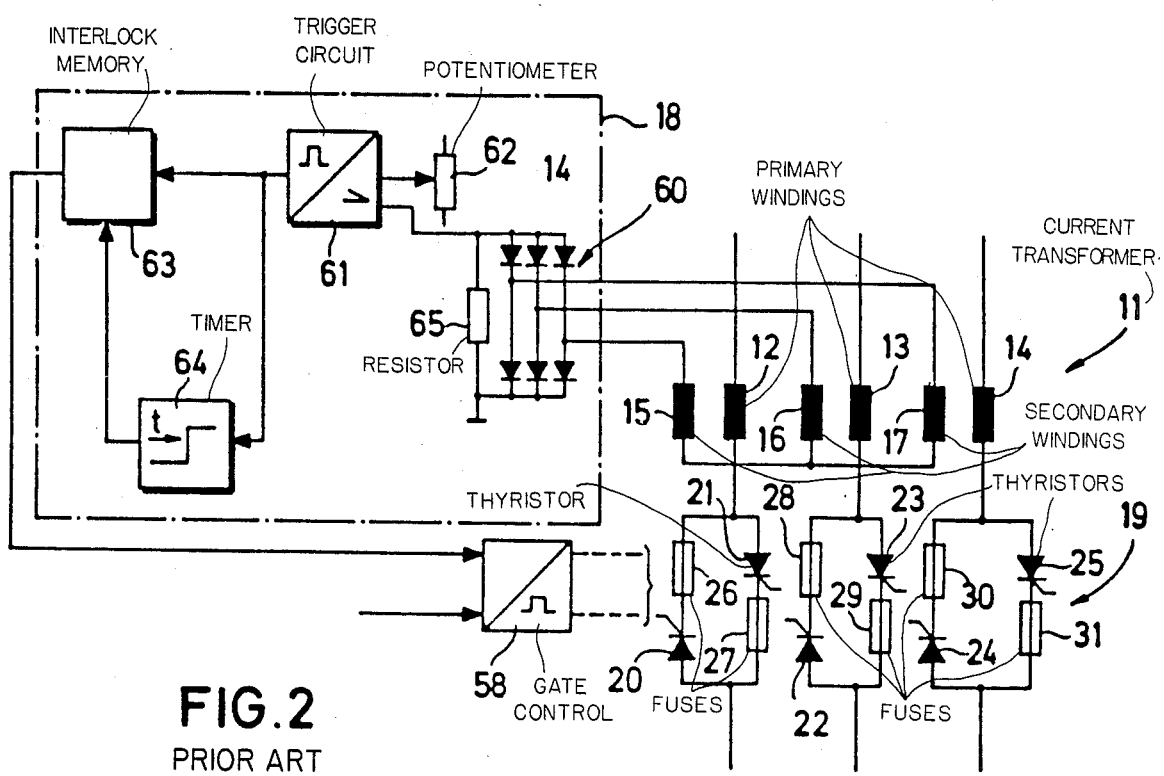
FIG. 2 is a schematic of the overload protector.

As FIG. 2 shows, the measurement in the short-circuit protector 18 is rectified by a rectifier and fed to a trigger circuit 61 whose threshold is adjustable by a potentiometer 62. If this threshold is exceeded, a register 63 is set and a timer 64 is activated. After a period of time which is set at the timer 64, the register 63 is restored to its original state. During the period in which the register is set, a signal is given to the grid control 58 which produces a pulsed operation of the thyristors 20-25.

Figure 3:
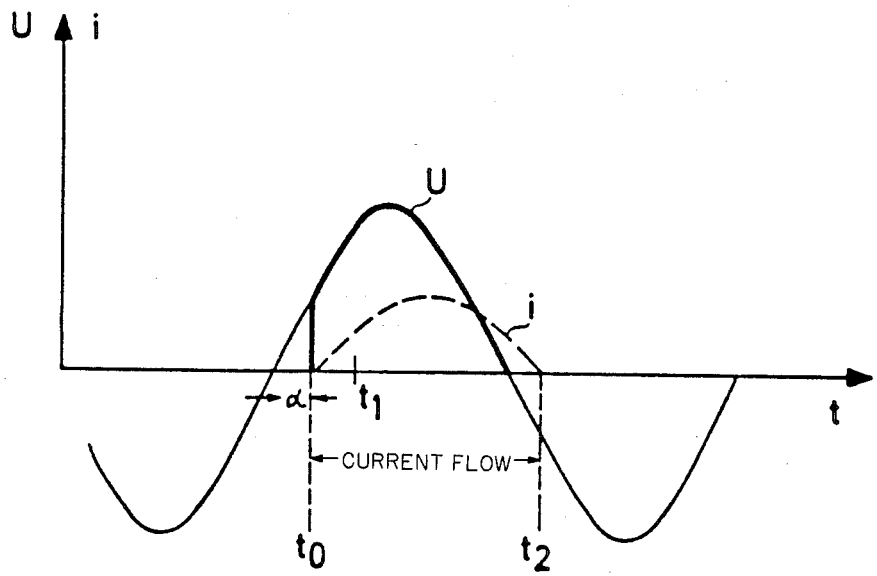
FIG. 3 is a graphic representation of the cut-off using conventional thyristors.

As FIG. 3 indicates, the conventional thyristors 20-25 do not turn off immediately, in spite of the turn-off command, but only after a time delay which is caused by the fact that conventional thyristors cannot turn off until after a voltage null. If, for example, a turn-off command occurs at point in time $t_1$, a current will still flow until the point $t_2$, because the length of time for which the current flows is determined by the starting time $t_0$ and the time $t_2$.

This time can therefore, in the most unfavorable case, amount to a half-wave, which amounts to 10 milliseconds in the case of a 50-Hz alternating current. Without the choke 46 limiting the current rise, the current during these 10 milliseconds would assume a value which would cause the fast-acting fuses 26-31 to respond, or even damage the thyristors 20-25.

The inductance of choke 46 required for current limiting is determined from the equation $$U_v = L \cdot \frac{\Delta i}{\Delta t}$$

wherein $U_v$ represents the voltage at the terminals 54 and 55, i the current through the choke 46, and t the time. If the permissible short-circuit current is established at five times the nominal current, then $$I_K = 5 \, I_n.$$

So, if the current within 10 msec may rise only to five times the nominal current, the necessary inductance is determined from the equation $$U_v = L \cdot \frac{I_k - I_n}{10 \text{ msec}} = L \cdot \frac{4 \, I_n}{10 \text{ msec}}$$

In the case of a power supply of, for example, 60 kilowatts, which has a load voltage of 30 KV and a nominal current of 2 A, the inductance will be:

$$L = 30 \text{ KV} \frac{10 \text{ msec}}{4 \cdot 2 A} = 37.5 \text{ Henry}$$

A choke 46 with this inductance has a weight on the order of half a metric ton.

Furthermore, at least the thyristors 20–25 and the fast-acting safety devices 26–31 have to carry the short-circuit current for the time t=10 msec, which means that these components have to be oversized.

Moreover, after the turn-off not only does the condenser 47 discharge, resulting in the dissipation of the energy $\frac{1}{2} CU^2$, but also the choke 46 discharges the energy $\frac{1}{2} LI^2$ stored therein. These energies $\frac{1}{2} LI^2$ can cause damage to the load device, since the magnetic energy of the choke 46 alone amounts in the above example to 1875 Wsec.

With the use according to the invention of GTO thyristors, the above disadvantages are avoided. If the above example is changed to GTO's and one assumes that the current turn-off occurs at $1.5 \times I_n$ in 15 microseconds, the inductance will be L=0.45 Henry with an energy content of only 2 Wsec.

Figure 4:
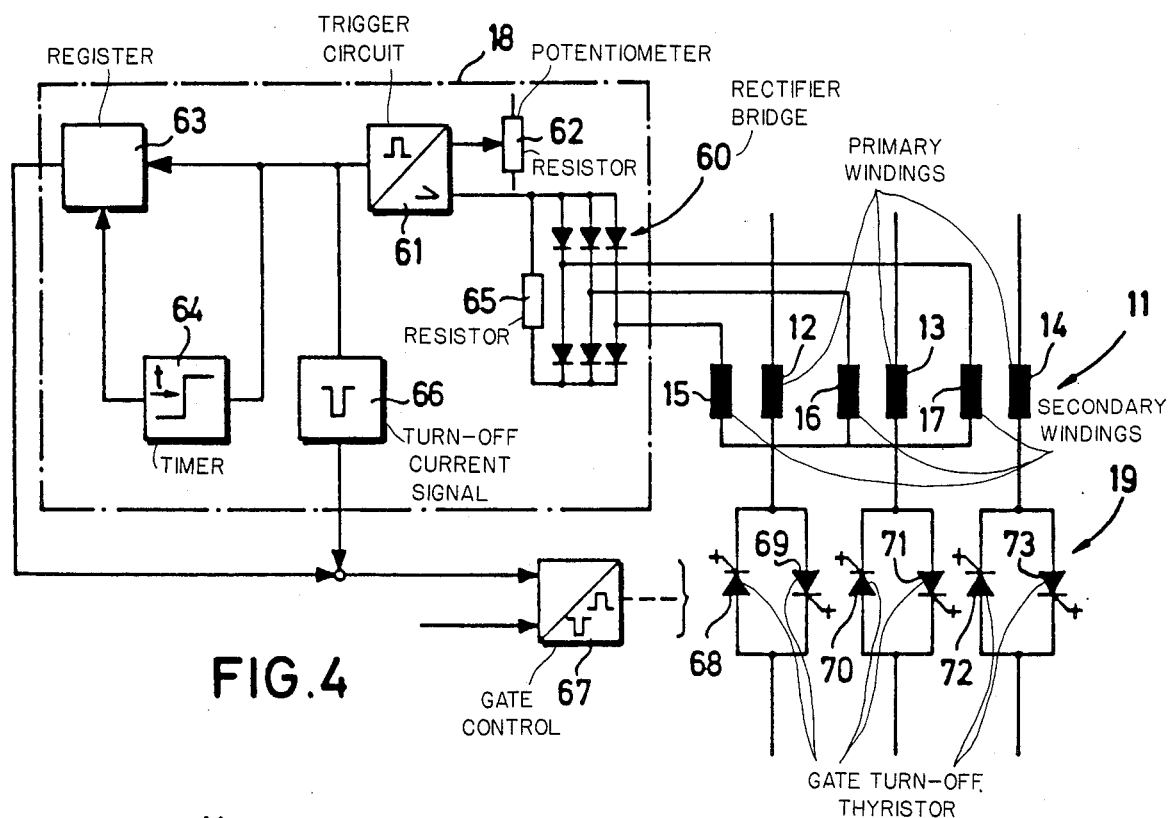
FIG. 4 is a schematic of the overload protector using GTO thyristors.

As FIG. 4 shows, the GTO thyristors can be so operated, by a modification of the circuit in FIG. 2, that the overload current remains substantially lower than in the conventional circuit.

In the circuit according to FIG. 4, the overload protection circuit 18, as compared with the system in FIG. 2, additionally has a unit 66 which supplies the turn-off current for the GTO thyristors 68–73.

If the threshold of the trigger circuit 61 is exceeded the latter sets the register 63, which activates the system 67. The latter then gives a turn-off command to the control electrodes of the GTO thyristors 68–73, i.e., it conducts the turn-off current from the unit 66 to the control electrodes of these GTO thyristors 68–73. Then the GTO thyristors 68–73, unlike the conventional thyristors, switch off virtually without delay. After a given time, which is determined by the timer 64, the GTO thyristors 68–73 are turned on again by appropriate control pulses.

Figure 5:
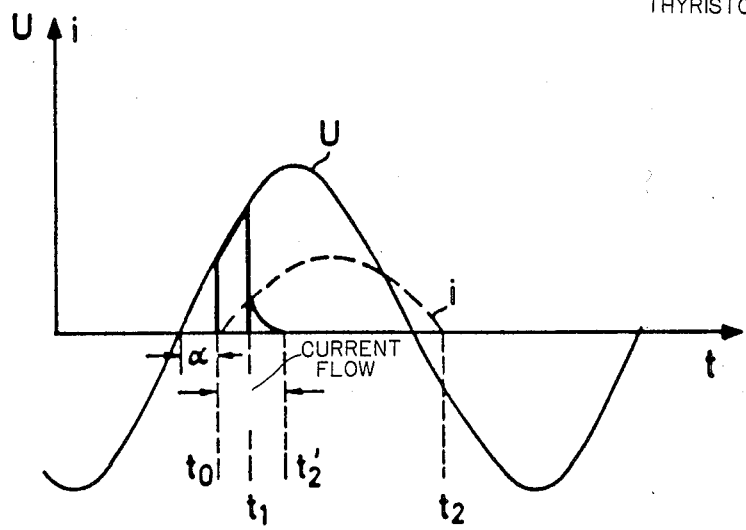
FIG. 5 is a graphic representation of the turn-off using GTO thyristors.

FIG. 5 shows, the the aid of a graph, how the current behaves when GTO thyristors are used. The graph relates to only one phase, but of course it applies accordingly to the other two phases of the 3-phase main. The voltage U that is represented, and the current I, are the electrical magnitudes present at a GTO thyristor 68–73. The phase shift between voltage and current is designated as the angle $\alpha$. If it is assumed that the GTO thyristor in question, e.g., the thyristor 68, has already received a turn-on pulse, the current flow begins at the moment $t_0$. If a dangerous overload occurs, which has to be switched off, the control electrode of the GTO thyristor is supplied virtually without delay with a turn-off current from the circuit 67. The turn-off command occurs, for example, at the moment $t_1$. After a brief decay time $t'_2$ the current i has decayed to the value zero.

This represents a substantially shorter time than the decay time $t_2$ in conventional thyristors. The current rise provided by a short circuit takes place virtually only in the brief period of time between the detection of the short circuit and the turn-off point $t_1$.

As previously mentioned, the choke 46 with the assumed numerical values has an inductance of only 0.45 Henry. If a higher-pulse rectification is performed on the secondary side of the transformer 35, the choke 46 and the condenser 47 can be entirely eliminated.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Power supply apparatus comprising:
   controlled rectifier elements connected in antiparallel relation and all being gate-turn-off thyristors;
   a three-phase transformer having primary windings connected in delta and having secondary windings;
   means for connecting the three phases of a three-phase main each through said controlled rectifier elements connected in antiparallel relation to said primary windings of said three-phase transformer;
   rectifiers;
   load terminals fed by said secondary windings through said rectifiers on a direct current side; and
   measuring sensors on the primary-side alternating-current side of said transformer, which, in the presence of an overload on the primary-side alternating current side, block said controlled rectifier elements.

2. Apparatus according to claim 1, which includes, in addition to the measuring sensors on the alternating current side, a measuring sensor on the direct current side, which, in the presence of an overload, causes on the direct current side a blocking of the gate-turn-off thyristors.

3. Apparatus according to claim 1, which includes a choke connected between a rectifier and a load terminal and a condenser connected parallel to said load terminals.

4. Apparatus according to claim 2, which includes means for comparing the actual value of at least one of the load voltage and the load current to a required value and in which the direct current side measuring sensor detects the actual level of at least one of the load voltage and the load current and feeds it to said comparing means which derives the difference between actual and required values for use to actuate the gate-turn-off thyristors.

5. Apparatus according to claim 4, which includes apparatus for the actuation of control electrodes of the gate-turn-off thyristors and which includes between said actuation apparatus and said comparing means a voltage regulator which regulates the voltage at the load within a presettable voltage range.

6. Apparatus according to claim 1, in which said measuring sensors on the primary-side alternating current side have one winding per phase, and which includes a plurality of diodes framing a three-phase rectifier having an output direct current voltage, said diodes each having an anode and a cathode, each primary-side alternating current winding being connected between an anode of one diode and a cathode of another diode, a threshold switch responsive to the output direct current voltage of said three-phase rectifier and whose threshold is a criterion for the presence of primary-side overload, a register which is set by the threshold switch, a timer, the output signal of the threshold switch being connected with said timer which restores the register to its starting state.

7. Apparatus according to claim 1, which includes an input 3-phase alternating current transformer which includes safety devices ahead of the three phases of the input 3-phase alternating current transformer.

8. Apparatus according to claim 7, which includes main switches between said safety devices and the phases of said input transformer.

9. Apparatus according to claim 1, which includes a fast-acting fuse connected in series with each of the gate-turn-off thyristors.

10. Apparatus according to claim 1, which includes switch elements connected in antiparallel parallel to each of said primary windings of said transformer, which short-circuit the primary windings in case of disturbance.

* * * * *